US008682466B2

(12) United States Patent
Ko et al.

(10) Patent No.: US 8,682,466 B2
(45) Date of Patent: Mar. 25, 2014

(54) AUTOMATIC VIRTUAL METROLOGY FOR SEMICONDUCTOR WAFER RESULT PREDICTION

(75) Inventors: Francis Ko, Taichung (TW); Chih-Wei Lai, Hsinchu (TW); Kewei Zuo, Yonghe (TW); Henry Lo, Hsinchu (TW); Jean Wang, Hsin-Chu (TW); Ping-Hsu Chen, Hsinchu (TW); Chun-Hsien Lim, Hsin-Chu (TW); Chen-Hua Yu, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 234 days.

(21) Appl. No.: 12/025,933

(22) Filed: Feb. 5, 2008

(65) Prior Publication Data
US 2008/0275586 A1 Nov. 6, 2008

Related U.S. Application Data

(60) Provisional application No. 60/916,194, filed on May 4, 2007.

(51) Int. Cl.
*G06F 17/50* (2006.01)

(52) U.S. Cl.
USPC ............ 700/110; 700/28; 700/104; 700/105; 700/108; 700/109; 700/121; 702/84; 702/127; 702/128; 702/183; 702/35; 703/14; 438/114; 438/637; 382/144; 382/149; 430/5; 430/30; 430/945

(58) Field of Classification Search
USPC ............................................. 706/62; 700/110
See application file for complete search history.

(56) References Cited

U.S. PATENT DOCUMENTS

| | | |
|---|---|---|
| 5,048,800 A | 9/1991 | Miyazaki et al. |
| 5,440,478 A | 8/1995 | Fisher et al. |
| 5,847,965 A | 12/1998 | Cheng |
| 5,963,881 A | 10/1999 | Kahn et al. |
| 6,028,991 A | 2/2000 | Akashi |
| 6,045,619 A | 4/2000 | Tai et al. |
| 6,077,310 A | 6/2000 | Yamamoto et al. |
| 6,223,139 B1 | 4/2001 | Wong et al. |
| 6,289,257 B1 | 9/2001 | Sekine |
| 6,408,219 B2 | 6/2002 | Lamey, Jr. et al. |
| 6,410,351 B1 | 6/2002 | Bode et al. |
| 6,549,864 B1 | 4/2003 | Potyrailo |
| 6,560,503 B1 * | 5/2003 | Toprac et al. ............... 700/108 |
| 6,738,859 B2 | 5/2004 | Liebchen |
| 6,773,931 B2 | 8/2004 | Pasadyn et al. |

(Continued)

OTHER PUBLICATIONS

Yue, H.H.; Qin, S.J.; Markle, R.J.; Nauert, C.; Gatto, M., Fault detection of plasma etchers using optical emission spectra, Aug. 2000, Semiconductor Manufacturing, IEEE Transactions on, vol. 13, Issue 3, Aug. 2000 pp. 374-385.*

(Continued)

*Primary Examiner* — Kavita Padmanabhan
*Assistant Examiner* — Olvin Lopez Alvarez
(74) *Attorney, Agent, or Firm* — Haynes and Boone, LLP

(57) ABSTRACT

A method to enable wafer result prediction includes collecting manufacturing data from various semiconductor manufacturing tools and metrology tools; choosing key parameters using an autokey method based on the manufacturing data; building a virtual metrology based on the key parameters; and predicting wafer results using the virtual metrology.

17 Claims, 7 Drawing Sheets

(56) References Cited

U.S. PATENT DOCUMENTS

| | | | |
|---|---|---|---|
| 6,810,296 B2* | 10/2004 | Bode et al. ............... 700/110 |
| 6,917,849 B1* | 7/2005 | Pasadyn et al. ............ 700/121 |
| 6,929,962 B1* | 8/2005 | Chang ....................... 438/10 |
| 6,931,607 B2 | 8/2005 | Gunderson et al. |
| 6,959,224 B2 | 10/2005 | Good et al. |
| 6,968,253 B2 | 11/2005 | Mack et al. |
| 6,980,873 B2 | 12/2005 | Shen |
| 7,062,737 B2 | 6/2006 | Tetelbaum et al. |
| 7,079,223 B2 | 7/2006 | Rosenbluth et al. |
| 7,100,134 B2 | 8/2006 | Wu et al. |
| 7,139,620 B2 | 11/2006 | Yamazaki et al. |
| 7,144,297 B2 | 12/2006 | Lin et al. |
| 7,151,976 B2 | 12/2006 | Lin |
| 7,181,365 B2 | 2/2007 | Inoue et al. |
| 7,212,878 B2* | 5/2007 | Funk et al ............... 700/121 |
| 7,245,354 B2 | 7/2007 | Granik |
| 7,263,463 B2 | 8/2007 | Yamazaki |
| 7,266,803 B2 | 9/2007 | Chou et al. |
| 7,313,279 B2 | 12/2007 | Duan et al. |
| 7,325,224 B2 | 1/2008 | Seltmann et al. |
| 7,337,093 B2 | 2/2008 | Ramani et al. |
| 7,359,759 B2* | 4/2008 | Cheng et al. ............. 700/121 |
| 7,360,191 B2 | 4/2008 | Chang et al. |
| 7,363,207 B2 | 4/2008 | Kamon |
| 7,383,521 B2 | 6/2008 | Smith et al. |
| 7,440,881 B2 | 10/2008 | Engelhard et al. |
| 7,451,429 B2 | 11/2008 | Ikeuchi |
| 7,475,377 B2 | 1/2009 | Yamada |
| 7,493,185 B2 | 2/2009 | Cheng et al. |
| 7,503,029 B2 | 3/2009 | Sinha et al. |
| 7,506,299 B2 | 3/2009 | Socha et al. |
| 7,523,429 B2 | 4/2009 | Kroyan et al. |
| 7,562,327 B2 | 7/2009 | Sekido et al. |
| 7,570,796 B2 | 8/2009 | Zafar et al. |
| 7,623,220 B2 | 11/2009 | Granik |
| 7,634,325 B2* | 12/2009 | Wang et al. ............. 700/121 |
| 7,673,260 B2 | 3/2010 | Chen et al. |
| 7,685,558 B2 | 3/2010 | Lai et al. |
| 7,689,954 B2 | 3/2010 | Zhang et al. |
| 7,694,244 B2* | 4/2010 | Chan et al. .............. 716/132 |
| 7,743,349 B2 | 6/2010 | Gupta et al. |
| 7,757,195 B2 | 7/2010 | Smith et al. |
| 7,788,629 B2* | 8/2010 | Zurbrick et al. ............ 700/110 |
| 7,842,519 B2* | 11/2010 | Winkler et al. ................ 438/5 |
| 7,849,366 B1* | 12/2010 | Purdy .......................... 714/47.1 |
| 7,865,864 B2 | 1/2011 | Banerjee et al. |
| 7,870,381 B2 | 1/2011 | Hekmatpour et al. |
| 7,926,018 B2 | 4/2011 | Moroz et al. |
| 7,954,072 B2 | 5/2011 | Liu et al. |
| 7,974,728 B2* | 7/2011 | Lin et al. ................. 700/121 |
| 2002/0095260 A1* | 7/2002 | Huyn ........................... 702/19 |
| 2003/0020928 A1* | 1/2003 | Ritzdorf et al. ............. 356/630 |
| 2004/0029299 A1 | 2/2004 | Pasadyn et al. |
| 2004/0040001 A1 | 2/2004 | Miller et al. |
| 2004/0093107 A1 | 5/2004 | Good et al. |
| 2004/0181299 A1 | 9/2004 | Yamazaki et al. |
| 2004/0185583 A1* | 9/2004 | Tomoyasu et al. ............. 438/8 |
| 2004/0265707 A1 | 12/2004 | Socha |
| 2005/0007577 A1 | 1/2005 | Engelhard et al. |
| 2005/0008227 A1* | 1/2005 | Duan et al. ................. 382/195 |
| 2005/0021272 A1 | 1/2005 | Jenkins et al. |
| 2005/0044514 A1 | 2/2005 | Wu et al. |
| 2005/0076322 A1 | 4/2005 | Ye et al. |
| 2005/0120328 A1 | 6/2005 | Seltmann et al. |
| 2005/0132306 A1 | 6/2005 | Smith et al. |
| 2005/0188338 A1 | 8/2005 | Kroyan et al. |
| 2005/0209820 A1 | 9/2005 | Inoue et al. |
| 2005/0288812 A1* | 12/2005 | Cheng et al. .............. 700/109 |
| 2006/0026539 A1 | 2/2006 | Tetelbaum et al. |
| 2006/0048010 A1* | 3/2006 | Tai et al. ..................... 714/37 |
| 2006/0111804 A1* | 5/2006 | Lin ............................. 700/110 |
| 2006/0123380 A1 | 6/2006 | Ikeuchi |
| 2006/0129257 A1* | 6/2006 | Chen et al. ................... 700/96 |
| 2006/0150132 A1 | 7/2006 | Gupta |
| 2006/0184264 A1* | 8/2006 | Willis et al. .................. 700/108 |
| 2006/0190876 A1 | 8/2006 | Yamada |
| 2006/0252348 A1* | 11/2006 | Lin et al. ........................ 451/5 |
| 2006/0282189 A1 | 12/2006 | Akisawa et al. |
| 2007/0055892 A1 | 3/2007 | Pikus |
| 2007/0101305 A1* | 5/2007 | Smith et al. ..................... 716/8 |
| 2007/0201442 A1 | 8/2007 | Hekmatpour et al. |
| 2007/0234246 A1 | 10/2007 | Sinha et al. |
| 2007/0265725 A1 | 11/2007 | Liu et al. |
| 2007/0266356 A1 | 11/2007 | Chang et al. |
| 2007/0266362 A1 | 11/2007 | Lai et al. |
| 2007/0277134 A1 | 11/2007 | Zhang et al. |
| 2007/0282767 A1* | 12/2007 | Cheng et al. ................. 706/15 |
| 2007/0288116 A1* | 12/2007 | Al-Bayati et al. ........... 700/121 |
| 2007/0288219 A1 | 12/2007 | Zafar et al. |
| 2008/0231307 A1* | 9/2008 | Bickford et al. ............. 324/765 |
| 2009/0070725 A1 | 3/2009 | Yamada |
| 2009/0083688 A1 | 3/2009 | Moroz et al. |
| 2009/0199151 A1 | 8/2009 | Banerjee et al. |
| 2009/0217216 A1 | 8/2009 | Lee et al. |
| 2009/0222785 A1 | 9/2009 | Cheng et al. |
| 2010/0312374 A1* | 12/2010 | Tsai et al. .................... 700/110 |

OTHER PUBLICATIONS

Yi-Ting Huang; Fan-Tien Cheng; Yeh-Tung Chen; Importance of Data Quality in Virtual Metrology, IEEE Industrial Electronics, IECON 2006—32nd Annual Conference on Nov. 6-10, 2006, pp. 3727-3732.*

Yaw-Jen Chang; Yuan Kang; Chih-Liang Hsu; Chi-Tim Chang; Tat Yan Chan; Virtual Metrology Technique for Semiconductor Manufacturing, Neural Networks, 2006. IJCNN '06. International Joint Conference on Jul. 16-21, 2006 pp. 5289-5293.*

Tung-Ho Lin; Ming-Hsiung Hung; Rung-Chuan Lin; Fan-Tien Cheng; A virtual metrology scheme for predicting CVD thickness in semiconductor manufacturing, Robotics and Automation, 2006. ICRA 2006. Proceedings 2006 IEEE International Conference on May 15-19, 2006 pp. 1054-1059.*

The Mathworks inc, "Statistics Toolbox for Use with MatLab", 2003, pp. 1-2, 6-25-6-45, 12-82.*

Wu et al, "Selection Schemes of DUal Virtual Metrology Outputs for Enhancing Prediction Accuracy", 2010, IEEE, pp. 1-8.*

Glynn, "Correlation Distances and Hierarchical Clustering", 2005, pp. 1-14.*

Finarov, "Monitoring choices of CMP planarization processes", 1997, pp. 391-398.*

Su et al, "Control relevant issues in semiconductor manufacturing: Overview with some new results", Dec. 2006, pp. 1268-1279.*

Tian, Yuxin, et al., "Impact of Photolithography and Mask Variability on Interconnect Parasitics," 10 pages.

Zhou, Ying, et al., "A New Methodology for Interconnect Parasitics Extraction Considering Photo-Lithography effects," 6 pages.

U.S. Appl. No. 12/025,933, filed Feb. 5, 2008 by Francis Ko, Chih-Wei Lai, Kewei Zuo, Henry Lo, Jean Wang, Ping-hsu Chen, Chun-Hsien Lin, and Chen-Hua yu for "Novel Methodology to Realize Automatic Virtual metrology," 23 pages.

Cheng, Y.C., et al., "Patterning Effect and Correlated Electrical Model of Post-OPC MOSFET Devices," Proceeding of SPIE vol. 6521 65210G-1 to 65210G-9, 9 pages.

Ottesen, Craig, "Front Opening Pod (FOUP) Fire Protection: A General Overview," International Sematech, Nov. 5, 1999, 10 pages.

Chen, Kuah-Chou, et al., "Integrated Circuits Industry/Front-Opening Unified Pod Auto-Loading Structure," Knowledge Bridge, No. 22, Apr. 2002, 4 pages.

Chappell, Jeff, "The Future is the FOUP—company Business and Marking," Electronic News, Jul. 17, 2000, 2 pages.

Ouyang, Charles, et al., "An Analytical Model of Multiple ILD thickness Variation induced by Interaction of Layout Pattern and CMP Process," IEEE Transactions on Semiconductor Manufacturing, Aug. 2000, 7 pages.

Raghvendra, Srinivas, et al., "DFM: Linking Design and Manufacturing," Proceedings of the 18th International conference on VLSI Design held jointly with 4th International Conference on Embedded Systems Design, VLSID, 2005, 4 pages.

Tsuijikawa, Hiroyuki, et al., "Power=Supply Noise Reduction with Design for Manufacturability," IEICE Trans Fundamentals, vol. E88-A, No. 12, Dec. 2005, 8 pages.

* cited by examiner

AUTOMATIC VIRTUAL METROLOGY FOR SEMICONDUCTOR WAFER RESULT PREDICTION

CROSS-REFERENCE

This application claims the benefit of U.S. Provisional Application 60/916,194 entitled "Method and Apparatus to Enable Accurate Wafer Prediction" filed May 4, 2007, incorporated herein by reference in its entirety. The present disclosure is related to the following commonly-assigned U.S. patent applications, the entire disclosures of which are incorporated herein by reference: U.S. application Ser. No. 11/290,108 filed Nov. 30, 2005 by inventors Shuh-Chwen Yeh and Chun-Hsien Lin for "Method and System for Filtering Statistical Process Data to Enhance Process Performance", U.S. application Ser. No. 11/941,518 filed Nov. 16, 2007 by inventors Chun-Hsien Lin, Amy Wang, Francis Ko, and Jean Wang for "Methodology to Enable Wafer Result Prediction Of Batch Tools", and U.S. application Ser. No. 12/026,361 filed Feb. 5, 2008 by inventors Chun-Hsien Lin, Francis Ko, Kewei Zuo, Henry Lo, and Jean Wang for "Extraction Of Key Process Parameter".

BACKGROUND

Semiconductor integrated circuits wafers are produced by a plurality of processes in a wafer fabrication facility (fab). These processes, and associated fabrication tools, may include thermal oxidation, diffusion, ion implantation, RTP (rapid thermal processing), CVD (chemical vapor deposition), PVD (physical vapor deposition), epitaxy, etch, and photolithography. During the fabrication stages, products (e.g., semiconductor wafers) are monitored and controlled for quality and yield using metrology tools. As the feature sizes of integrated circuits are reduced, the amount of monitoring and controlling may need to be increased. This, however, increases costs by the increased quantity of metrology tools required, the increased manpower to perform the monitoring and controlling, and the associated delay in manufacturing cycle time.

Accordingly, a virtual metrology model is utilized for the production control and other purposes with reduced cost. However, the existing virtual metrology model takes intensive manpower for analyzing and checking each parameter/step, which is time consuming. In addition, some key parameters/steps can be missed due to wrong judgment, resulting in non-precise and misleading predictions. The associated wafer variations cannot be predicted by the existing method and the existing virtual metrology model.

Therefore, what is needed is a system and method for increasing the monitoring, controlling, and/or otherwise predicting device parameters, quality, and/or yield of products.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figures 1, 2:
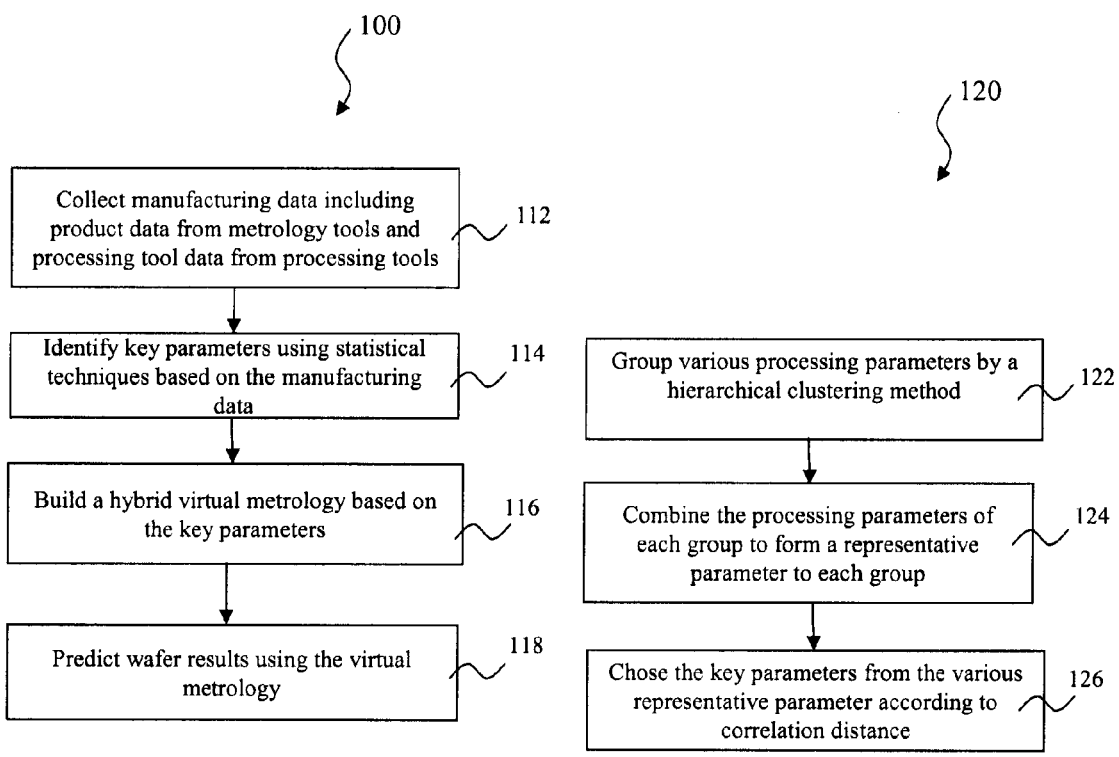
FIG. 1 is a simplified flowchart of one embodiment of a wafer result prediction method constructed according to aspects of the present disclosure.
FIG. 2 is a simplified flowchart of a wafer result prediction method in another embodiment constructed according to aspects of the present disclosure.

It is to be understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. A novel method to enable wafer result prediction of batch processing tools is provided and described below with various examples, embodiments, variations, and descriptions.

Figure 5:
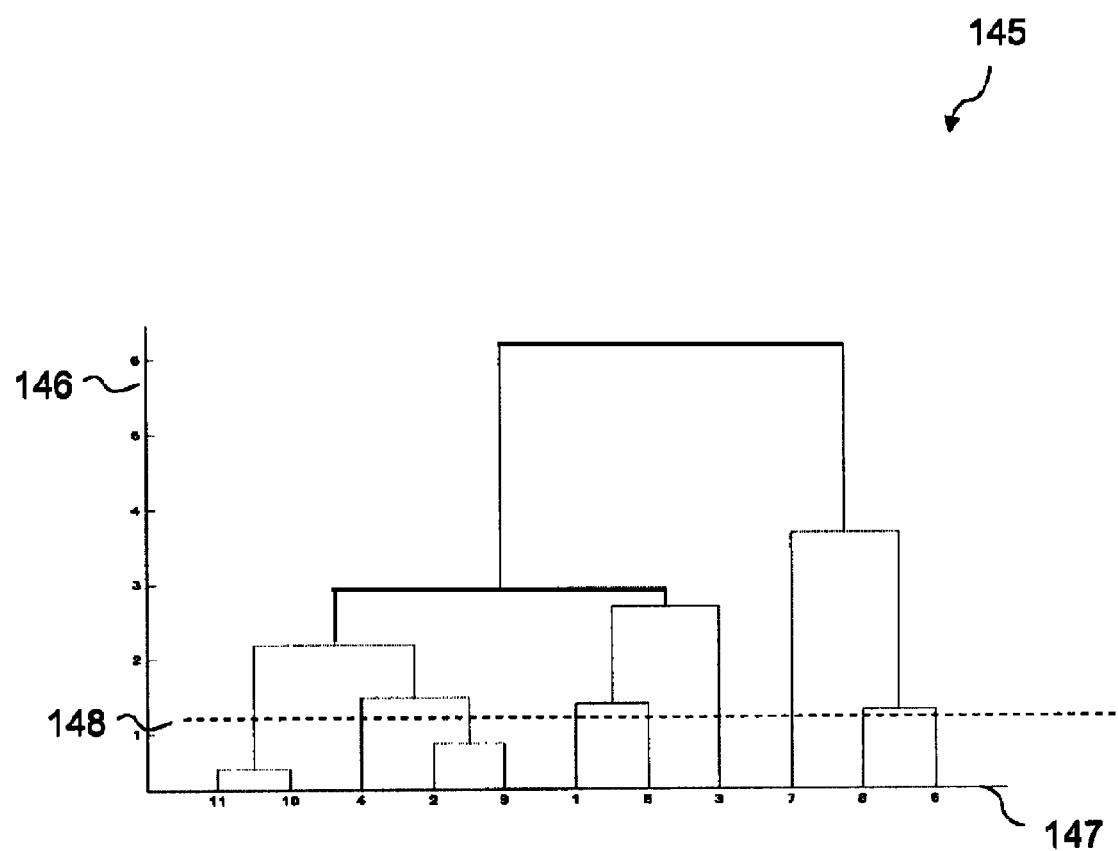
FIG. 5 is a diagram showing a binary hierarchical tree used for parameter clustering in one embodiment constructed according to aspects of the present disclosure.
Figure 6:
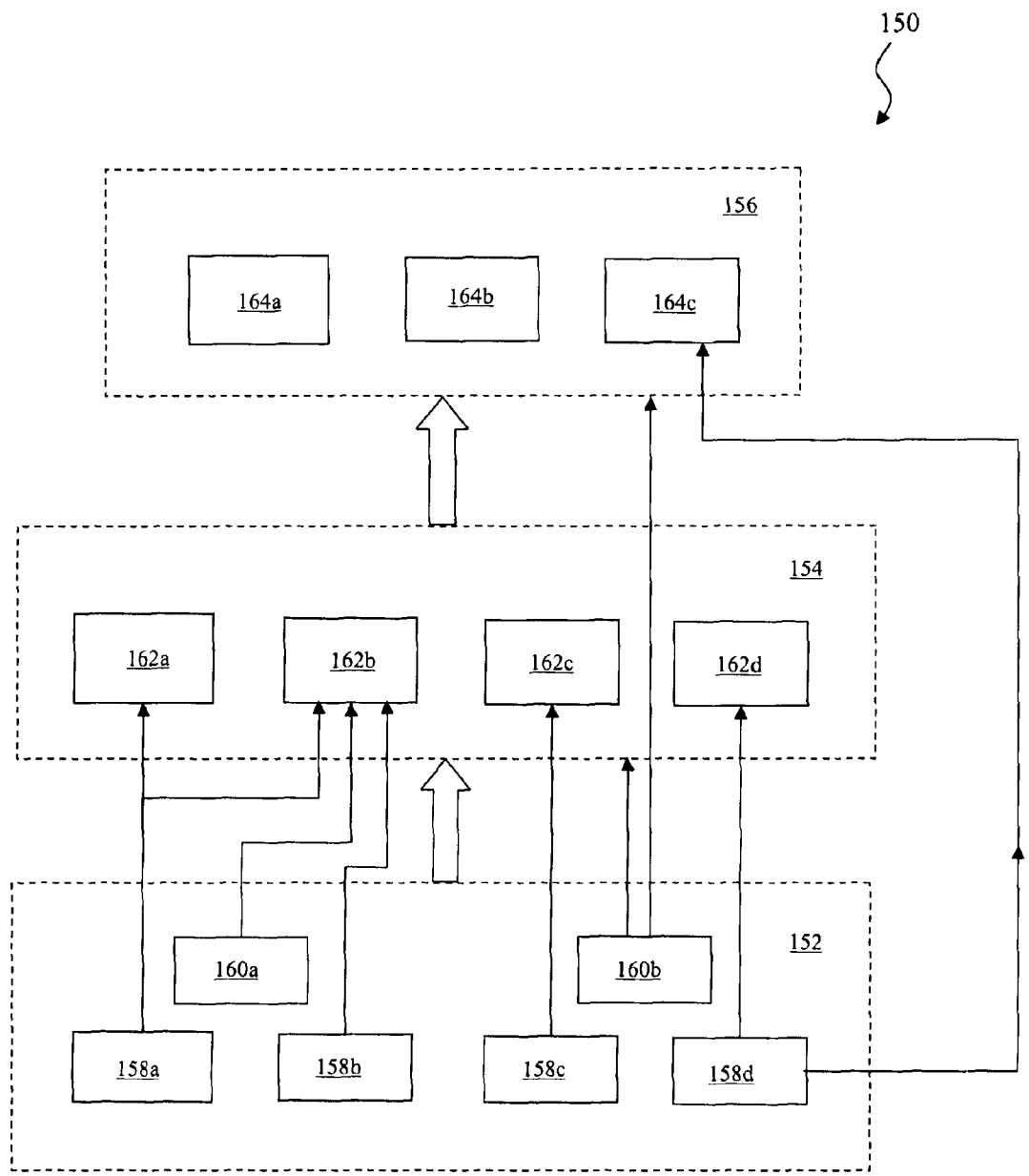
FIG. 6 is a block diagram of a hybrid virtual metrology model in one embodiment constructed according to aspects of the present disclosure.
Figure 7:
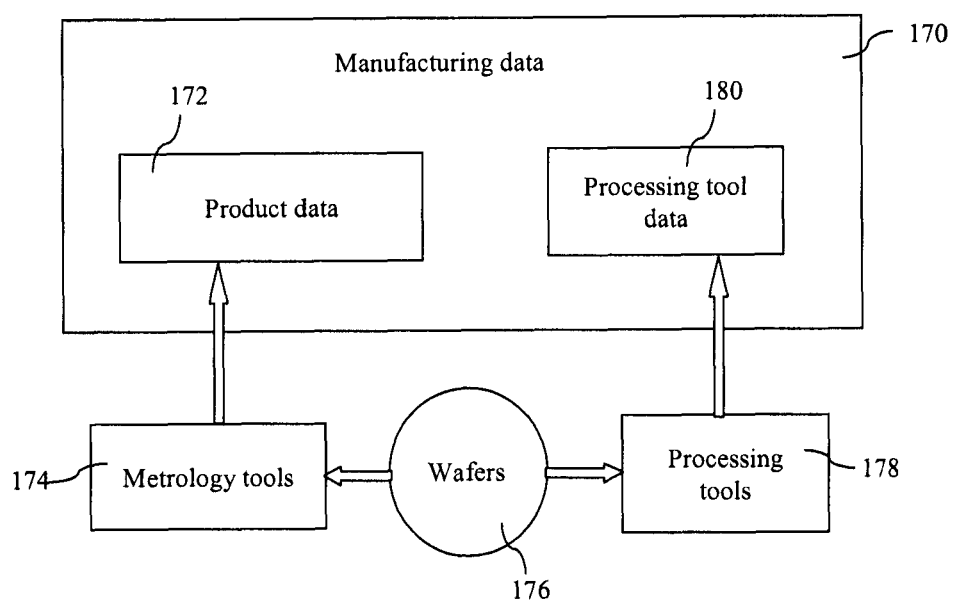
FIG. 7 is a block diagram of one embodiment of manufacturing data constructed according to aspects of the present disclosure.
Figure 8:
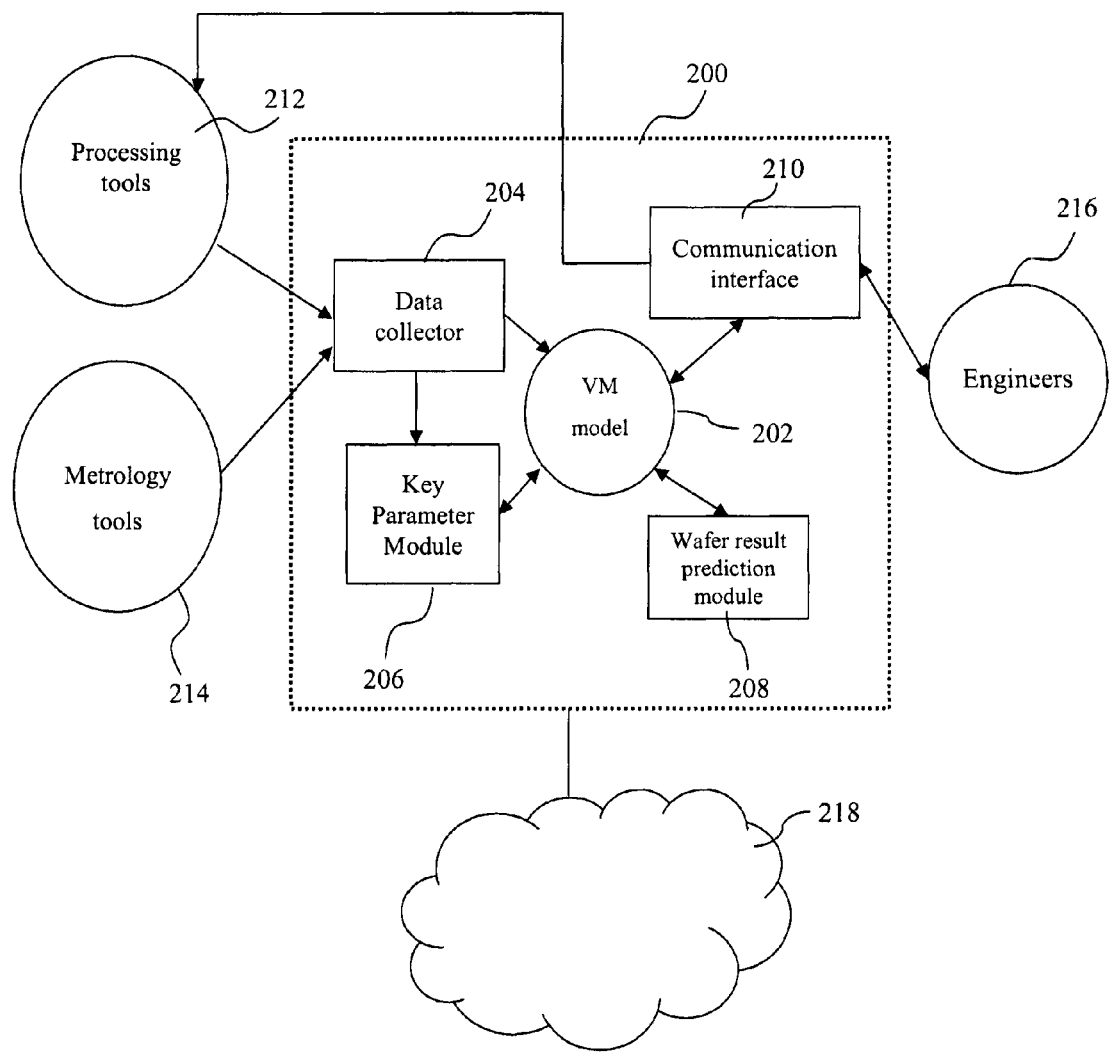
FIG. 8 is a block diagram of one embodiment of a virtual metrology system to implement the method of FIG. 1.

FIG. 1 is a simplified flowchart of a method 100 for enabling wafer result prediction using a hybrid virtual metrology and/or clustering technique. FIG. 6 is a block diagram of a hybrid virtual metrology model 150 in one embodiment constructed according to aspects of the present disclosure. Illustrated in FIG. 8 is a block diagram of one embodiment of a virtual metrology system 200 based on the hybrid metrology model 150 and used to implement the method 100. The present disclosure provides a method and a system to predict wafer result using a hybrid virtual metrology model and/or a clustering method. The method 100 and the system 200 are described below, with reference to FIGS. 1 through 8.

The method 100 begins at step 112 by collecting manufacturing data. As illustrated in FIG. 7, a block diagram of the manufacturing data 170 in one embodiment, the manufacturing data 170 include product data 172 (processed wafer data) collected from one or more metrology tools 174. The product data 172 include test and measurement results of products, such as wafer(s) 176 after having been processed by one or more processing tool (or tools) 178. For example, the product data may be measured values of a product parameter (wafer parameter or device parameter), such as thickness, reflectivity, or conductivity of a material layer formed by the processing tool. In one example, the product data 172 include inline test results from test structures formed on the subscribe lines of the wafers 176. In another example, the product data 172 include final test results after the completeness of wafer fabrication to the wafers 176.

The manufacturing data 170 also include processing tool data 180 collected from the processing tool 178. The processing tool data 180 are associated with the processing tool and include various setting parameters of the processing tool during the fabrication of the wafer 178 and the various values used in the processing recipe used in the processing tool during the fabrication of the wafer 178. The various setting parameters of the processing tool and various values of the processing recipe are collectively referred to as processing parameters. In one embodiment, the processing parameters include active parameters, such as power, gas flow, and/or processing duration. In another embodiment, the processing parameters may additionally or alternatively include passive parameters that are not directly set in the processing tool and not directly defined in the processing recipe. For example, the passive parameters include temperature, reflectivity, and/or deposition rate. The processing tool data 180 include data of the various processing parameters extracted from the processing tool.

A processing tool is a tool designed and configured for processing/fabricating one or more products, such as a semiconductor wafer. The processing tools 178 may include, for example, a chemical vapor deposition (CVD) system, an etching system, a thermal oxidation system, an ion implantation system, a physical vapor deposition (PVD) system, a rapid thermal annealing (RTA) system, or other proper tools designed for integrated circuit fabrication.

The metrology tools 174 may include electrical, optical, and/or analytical tools, such as microscopes, micro-analytical tools, line width measurement tools, mask and reticle defects tools, particle distribution tools, surface analysis tools, stress analysis tools, resistivity and contact resistance measurement tools, mobility and carrier concentration measurement tools, junction depth measurement tools, film thickness measurement tools, gate oxide integrity test tools, C-V measurement tools, focused ion beam (FIB), and other test and measurement tools. The product data may include results of various wafer parameters measured by the metrology tools. The wafer parameters may include sheet resistance, reflectivity, stress, particle density, and critical dimension, to name a few. The wafer data may further include other data such as wafer ID and product type.

As an example, a plurality of products (semiconductor wafers) are processed through various processing steps. The processing tools 178 may be programmed, set, and configured according to a process recipe when the wafers are processed therein. The processing recipe may define a plurality of sub-steps. For example, a PVD deposition recipe may define the following sub-steps: degas, cleaning, and metal deposition. Each sub-step may be defined with a processing duration and may set various tool parameters to certain levels, respectively. After the wafers have completed the processing step for wafer fabrication by one of the processing tools 178 according to the process recipe, one or more of the metrology tools may be utilized to test and measure the wafers for the product data. The processing tool data are collected from the associated processing tool. The manufacturing data, including product data and processing tool data, may be collected from the metrology tools 174 and the processing tool 178, respectively, by a data collector 204 of the wafer result prediction system 200.

The method 100 proceeds to step 114 to identify key parameters using an autokey statistical technique based on the manufacturing data. This step to identify key parameters may be implemented by a key parameter module 206 of FIG. 8. During wafer fabrication, various processing parameters, including the values defined in the processing recipes and the setting parameters in the processing tools, each has more or less impacts to the fabricated products (wafers). To build a wafer result prediction model to predict a device, all relevant processing parameters may be valued to determine the most relevant parameters, referred to as key parameters. However, the existing method takes more engineering effort, making the method inefficient and time consuming to build and maintain the prediction model. The present disclosure realizes automatic selection of the key parameters by using a clustering method and/or combination of the related parameters, collectively referred to as autokey method. In one embodiment, a clustering method is used to group various related processing parameters. For example, if wafer edge temperature T1 and wafer center temperature T2 are correlated, they may be grouped to form one parameter, referred to as a representative parameter. In such, the number of the processing parameters used in the prediction model can be reduced. In another embodiment, the representative parameters are chosen by properly combining various related processing parameters. In furtherance of the above example, the wafer edge temperature T1 and wafer center temperature T2 are correlated, one of them is chosen as the representative parameter. In a more complicated situation, T1 and T2 are correlated to each other but are not highly related to a device parameter to be predicted by the prediction model. But another parameter DT, defined as the difference between T1 and T2, is correlated to the device parameter more highly than each of T1 or T2 does. Therefore, neither T1 nor T2 are key parameters in this case but the combined parameter DT=T1−T2 is a key parameter to predict the device parameter. A key parameter can be a linear combination of the grouped processing parameters. Generally, a key parameter is formed by a formula expressed by the related processing parameters to be grouped. A key parameter may be identified by the correlation distance to a device parameter.

The processing parameters may be grouped using hierarchical clustering (HC). HC methods are useful for analyzing gene expression data as well as many data in other contexts. It takes agglomerative approaches. The clustering process starts with each gene (or other parameter) as an individual cluster. These clusters are then successively merged together to form new, larger clusters. The sequence of clusters is represented by a hierarchical binary tree, which can be cut at a specific hierarchical level to obtain a desired number of clusters. The topology of the clusters is a binary tree. During the clustering process, the number of clusters are reduced.

For example, hierarchical clustering includes determining a first and second parameter that are highly correlated, and grouping the first and second parameter into a single group for further analysis. A plurality of processing parameters that are highly correlated can be grouped. In one example, parameters that are correlated with an $R^2$ value of at least 0.7 are grouped together. Thus, in an embodiment, a group includes parameters that have an $R^2$ value among one another of at least 0.7. In an embodiment, one or more groups of parameters may be accumulated together to form a larger group.

In an embodiment, a hierarchical binary tree is used to group the parameters. FIG. 5 shows a binary hierarchical tree 145, in one embodiment, used for parameter clustering. One example of grouping processing parameters is described below with reference to FIG. 5. The hierarchical binary tree 145 includes a vertical axis 146 including correlation distance and a horizontal axis 147 including parameter group designations. Small correlation distances represent a high $R^2$ value among the parameters of the group. The cut-off point 148 illustrates a selected correlation distance that provides adequate correlation among the parameters. In an embodiment, parameters with correlation distances below the cut-off point 148 may be grouped. This process can be repeated for further grouping. In one embodiment, a new cut-off point may be defined. Groups with correlation distances below a new cut-off point may be further analyzed as a group.

At this step, the method automatically identifies key parameters which are highly correlated to a device parameter. Automatically identifying key parameters utilizes various statistical methods which are described in further detail below. Automatically identifying key parameters may further include identifying key steps. For example, a pressure may be a key parameter in first and second processing steps but is not a key parameter in the rest of the processing steps.

The method 100 proceeds to step 116 by building a virtual metrology model based on the key parameters identified at the previous step. This step may be implemented by a virtual metrology module 202 illustrated in FIG. 8. The virtual metrology model is capable of predicting wafer results without additional measurement and predicting wafer electrical failure without further manufacturing. Thus, a failed wafer may be scraped earlier with reduced manufacturing cost. The virtual metrology (VM) model can be used to predict wafer results for one or more device parameters. In one embodiment, a hybrid virtual metrology model is used for the wafer result prediction. The hybrid virtual metrology model includes two level modeling. FIG. 6 is a block diagram of a hybrid virtual metrology model 150 in one embodiment. With reference to FIG. 6, the hybrid virtual metrology model 150 is described. The hybrid virtual metrology model 150 includes a first level model using manufacturing data 152 as the input and providing physical performance parameters (physical parameters) 154 as the output. The hybrid virtual metrology model 150 also includes a second level model using the physical parameters 154 as the input and providing electrical performance parameters (electrical parameters) 156 as the output. In another embodiment, the second level model additionally or alternatively uses manufacturing data as the input and provides electrical parameters. The manufacturing data 152 may include the processing tool data associated with the processing parameters from the processing tool and/or the product data associated with the device parameters from the metrology tools. In one embodiment, the manufacturing data 152 may include the processing tool data from a plurality of processing tools, such as processing tools 158*a*, 158*b*, 158*c*, and 158*d*. Only, for example, the processing tool 158*a* may represent one or more polysilicon etching tools. The processing tool 158*b* may represent one or more spacer etching tools. The processing tool 158*c* may represent one or more source/drain ion implant tools. The processing tool 158*d* may represent one or more source/drain implant rapid thermal annealing (RTA) tools. In one embodiment, the manufacturing data 152 may include the product data from a plurality of metrology tools, such as metrology tools 160*a* and 160*b*. Only for example, the metrology tool 160*a* may represent one or more metrology tools designed to measure the thickness of a dielectric film. The metrology tool 160*b* may represent one or more metrology tool designed to measure the resistivity of a metal film. The physical parameters 154 may include various physical parameters, such as 162*a*, 162*b*, 162*c*, and 162*d* for example. In furtherance of the example, only for illustration, the physical parameter 162*a* represents the thickness of silicon oxide. The physical parameter 162*b* may represent the thickness of a polysilicon layer. The physical parameter 162*c* may represent the dimension of the gate spacer from the gate to the source on the substrate. The physical parameter 162*d* may represent a dimension of the source region. In the first level model, one physical parameter is determined by a subset of the manufacturing data, such as the manufacturing data associated with a subset of the processing parameters. For example, the thickness of a doped polysilicon layer may be determined by the processing tool data from the polysilicon deposition tool and polysilicon etching tool. More specifically, the thickness of a doped polysilicon layer may be determined by the processing tool data associated with key parameters. In the first level model, various physical parameters can be predicted without direct measurement by the metrology tools.

The electrical parameters 156 include various parameters associated with electrical performance of the products, such as electrical parameters, 164*a*, 164*b*, and 164*c*. As one example for illustration, the electrical parameter 164*a* represents the resistance of a polysilicon gate. The electrical parameter 164*b* may represent the parasitic capacitance between two adjacent metal lines. The electrical parameter 164*c* may represent the resistivity of the source region. In the second level model, one electrical parameter can be determined by a subset of the physical parameters and/or a subset of the manufacturing data. For example, a capacitance of a capacitor can be determined by the various dimensions and dielectric constant of the dielectric interposed between the two electrodes using a physics formula. In another example, the resistivity of a source region may be directly determined by the processing parameters associated with the source/drain ion implant tool. FIG. 6 illustrates various arrowed lines from an input to an output. For example, the physical parameter 162*b* is determined by the processing tool data from processing tools 158*a* and 158*b*, and the product data from the metrology tool 160*a*. In another example, the electrical parameter 164*c* is determined by the processing tool data from the processing tool 158*d*. Various hybrid virtual metrology model may be generated. Each of them may be used to determine one or more physical and/or electrical parameters. The hybrid virtual metrology model may be dynamically maintained such as regenerated or modified according to newly accumulated manufacturing data. During the lifetime of the virtual metrology model, the virtual metrology model may be tuned and aligned with the processing tools as the processing tool may experience various drifting and variations. In this flexible adaptive methodology, different levels of the virtual metrology models are updated when the latest data are available to catch process drift and other changes.

The method may proceed to step 118 by predicting wafer results using the virtual metrology created at the previous step. This step may be implemented by the wafer result prediction module 208 of FIG. 8. In one embodiment, the hybrid virtual metrology model is used to predict physical parameters, such as various dimensions of the integrated circuit features of a wafer based on the manufacturing data. In another embodiment, the hybrid virtual metrology model is used to predict electrical parameters of a wafer based on the manufacturing data. The hybrid virtual metrology model may additionally use some of the physical parameters determined from the first level model to determine the electrical parameters. Furthermore, the predicted physical parameters and/or electrical parameters of a wafer can be used to determine if the wafer needs to be scraped without resuming the fabrication to save the cost. In furtherance of that example, the predicted electrical parameters may be used as a virtual wafer acceptance test (WAT) to determine the quality and acceptance of a wafer. In the existing method, final WAT takes a long testing time for all wafers to assure wafers' quality.

Furthermore, potential abnormal wafers having electrical performance impact cannot be detected in the very early stage. The disclosed method can predict wafer electrical performance with no manufacturing cost.

In another example, the predicted physical parameters and/or electrical parameters of a wafer may be used to determine if the wafer needs rework to save the wafer and resume the fabrication after the rework. In another example, the predicted physical parameters and/or electrical parameters of a wafer may be used to determine if a processing tool needs to be reset or reconfigured for proper fabrication to the following wafers. In one embodiment, the method 100 uses the existing manufacturing data to identify key parameters and to build the virtual metrology model, and uses the new manufacturing data associated with a wafer to determine the various physical parameters and/or the electrical parameter of that wafer.

The current method can automatically select key parameters and build the virtual metrology, thereby saving the virtual metrology model development time and avoiding the negligence of some key parameters. The above disclosed wafer result prediction method may have various alternatives, modifications, and extensions without departure of the spirit of the disclosed method. Another embodiment of the autokey method used to identify key parameters is described below with reference to FIG. 2. FIG. 2 is a flowchart of an autokey method 120 to identify key parameters. The method 120 begins at step 122 by grouping various processing parameters by a hierarchical clustering technique, such as the binary hierarchical clustering method of FIG. 5. Highly correlated parameters are grouped together. Such clustering method can be repeated using different correlation distances as cutoff points.

The method 120 then proceeds to step 124 by combining the processing parameters of each group to form a representative parameter to each group. Various combination of the processing parameters in the same group may have different correlation distance to a device parameter. The proper combination has a highest correlation coefficient, therefore shortest correlation distance, to the device parameter. The new parameter associated with the proper combination may be chosen as the representative parameter, and may be further chosen as a key parameter if the correlation distance falls in a correlation distance defined as criteria.

In an embodiment, the correlation (e.g., $R^2$ value) between a group and the selected device parameter is determined by principal component transformation plus stepwise regression. For example, the principal component transformation may transform highly correlated process parameters into a smaller data set (e.g., group). As an example, an $R^2$ value of X1 (a parameter) to the selected device parameter is 0.1, an $R^2$ of X2 (a parameter) to the selected device parameter is 0.1, the $R^2$ of the group of X1 and X2 may be (1)>0.2, (2)=0.2, or (3)<0.2. The result of condition (1), (2), or (3) is dependent upon the data analyzed and combination of X1 and X2. Stepwise regression utilizes conditional $R^2$ to select process parameters falling under the designated condition (1). In other words, the methodology described herein is capable of finding parameters that when grouped together find correlation to a device parameter that is greater than the sum of them separately.

The method 120 proceeds to step 126 by choosing key parameters from the various representative parameters according to the correlation distance to the device parameter. In this step, the correlation between the representative parameter to the selected device parameter is determined. A subset of representative parameters, key parameters (e.g., those with greater correlation to the selected device parameter) may also be determined. In an embodiment, for one or more representative parameters associated with plurality of groups, the $R^2$ value of the representative parameter to the device parameter is calculated by principal component transformation plus stepwise regression. In an embodiment, a group of parameters are related to the device parameter with different mechanisms at different fabrication processing steps. In the embodiment, the regression and $R^2$ calculation are implemented separately for each of the various steps. For some parameters, the steps 124 and 126 of the method 120 may be reduced into one step where the representative parameter is determined and is also determined if it is chosen as a key parameter at the same based on a given criteria of the correlation distance.

In another embodiment, the method 100 can be used to extract key parameters from fault detection and classification (FDC) Data. Currently, process and equipment engineers can only build the relation between equipment parameters and wafer results by experiment or field experience. The identification of key parameters of a tool parameter has to be set up manually. However, experiments or splits can only be done on active parameters (e.g., RF Power, gas flow rate). Passive parameters such as reflected power need to be learned from production experience, which takes a long time to accumulate.

Figures 3, 4:
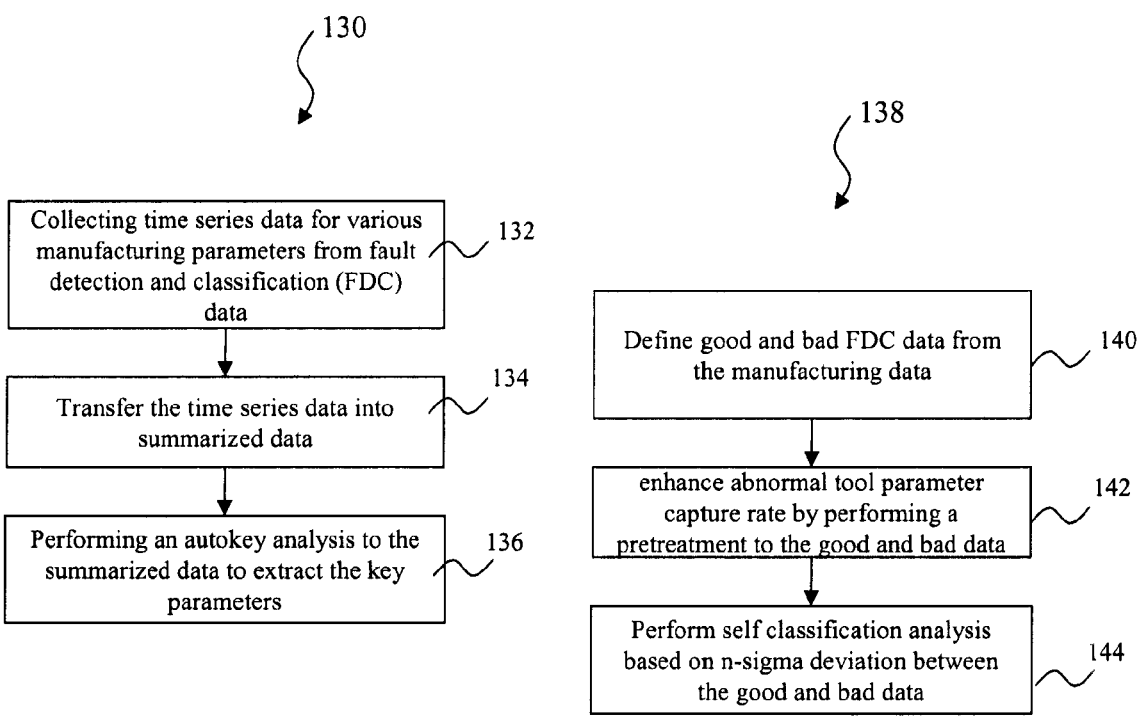
FIG. 3 is a simplified flowchart of a wafer result prediction method in another embodiment constructed according to aspects of the present disclosure.
FIG. 4 is a simplified flowchart of a wafer result prediction method in another embodiment constructed according to aspects of the present disclosure.

A novel methodology to extract key parameters from fault detection and classification (FDC) data is provided and described. FIG. 3 provides a flowchart of a method 130 in one embodiment. With reference to FIG. 3, the method 130 includes a step 132 to download (or collect) the related time series data associated with various manufacturing parameters from fault detection and classification data. Engineer experimental effort is eliminated since available product data are utilized.

The method 130 also includes a step 134 to transform the time series data into summarized data to condense data. The summarized data include average, maximum, minimum, and standard deviation of radio frequency (RF) power at step 1 as one example.

The method 130 also includes a step 136 to perform an autokey analysis to extract key parameters and their interaction behavior. As mentioned above, the autokey analysis includes grouping various parameters by hierarchical clustering according to correlation among the various parameters. For example, if parameters A and B are highly correlated, then they are categorized into one group. A group of parameters are highly correlated and may represent the root cause behind process drift. The groups are sorted according to their impacts to process. The autokey analysis also includes calculating the $R^2$ of each group of parameters relative to a wafer parameter by principal component transformation plus stepwise regression.

The present method may have various advantages in various embodiments including no experiment or design of experiment (DOE) effort and zero wafer cost. Both active and passive parameters can be analyzed at the same time. Qualitative indexes are provided to indicate the contribution of each key parameter to final wafer result variation.

In another embodiment with reference to FIG. 4, a method 138 is provided for collecting FDC data. The method 138 includes a step 140 to define good and bad FDC data from the manufacturing data using a set of criteria, a step 142 to enhance abnormal tool parameter capture rate by performing a pretreatment to the good and bad data, such as averaging to reduce data noise, and a step 144 to perform self classification analysis based on n-sigma deviation between the good and bad data.

With reference to FIG. 8, the wafer result prediction system 200 is further described in detail. In one embodiment, the various steps and procedures of the disclosed method 100 can be implemented in the system 200. The system 200 includes a virtual metrology module designed to generate, use, and maintain a hybrid virtual metrology model for wafer result prediction. The system 200 may further include additional components combined, distributed, and coordinated to be operable to generate the virtual metrology model 202 and maintain thereof. The model 202 may include a plurality of sub-models associated with a combination of various product parameters to be predicted (such as film thickness and film resistivity) and a plurality of batch processing tools (such as a PVD tool for metal deposition). Each sub-model of the model 202 may be associated with one product parameter and one or more fabrication tool.

The model 202 can be adaptive such that it is dynamically maintained to fit to the fabrication tool and follow changes of the fabrication tool over time. Maintaining the adaptive model may include adjusting the model based on new manufacturing data, which may further include performing regression based on the manufacturing data. The adaptive model may be evaluated after the associated fabrication tool's maintenance, repair, wafer products change, and/or certain periods of time. The procedure is not necessarily limited to the above described as long as the adaptive model is adjusted timely and properly to reflect changes, shifting, and drifting of the batch fabrication tools and/or wafer products.

The system 200 also includes a data collection module 204 designed to collect the manufacturing data, including the processing tool data from the processing tools 212 and the product data from the metrology tools 214. The system also includes a key parameter module 206 designed to implement the method 100 to identify key parameters. The system 200 may further include a wafer result prediction module 208.

The system 200 may further include a communication interface 210 to communicate the predicted wafer result among the system 200 and pertinent manufacturing owners/customers. For example, the predicted wafer result may be sent to engineers 216 for evaluation, production monitor, and/or process improvement. In another example, the engineers may provide input in various steps of the method 100, such as involvement in selecting key parameters. The engineers 216 may communicate with the system through the communication interface 210. The communication interface may provide an alarm to the engineers when the wafer results are out of a predefined range, has apparent shifting, or has other serious changes. The predicted wafer result may be sent to a data control center such as a manufacturing execution system (MES) wherein the predicted wafer result is further processed, organized, and distributed for data monitoring, evaluation, analysis, and/or control, such as statistical process control (SPC). The predicted wafer result may be sent to the processing tool 212 wherein the process recipe and hardware parameters may be adjusted to compensate for any drifting and/or shifting from the current process step for optimized wafer quality, performance, and yield.

As long as a virtual metrology model is created for one (or more) processing tool, the maintenance of the model and implementation thereof for wafer result prediction need not be in the order described in the above method 100. The maintenance and implementation of the result prediction model may be carried on in parallel. Therefore, the model 202 substantially represents wafers processed at the fabrication tool.

The system 200 of FIG. 8 serves only as an example to the present disclosure. Each module thereof may include software and/or hardware to implement its functions. For example, the virtual metrology model 202 may include hardware, such as computer and memory for operation and storage. The model may include software for generation and maintenance thereof. The model may further include a database having all product data and processing tool data. Each module may be configured and connected to other modules and other components of the semiconductor manufacturer. The system 200 may be configured and organized in different ways such as with less or more modules without departure from the spirit of the present disclosure. The system 200 may be further connected to a network 218. In one example, the system 200 may be connected to or include part of a virtual fab illustrated in FIG. 9, which will be described later.

Thus, the wafer results can be alternatively predicted by the system 200 using the method 100 other than direct measurement. Based on the manufacturing data, with limited metrology tools and measurement cost, the wafer result can be effectively monitored for enhanced process performance and enhanced wafer yield. The disclosed method and system provide a new approach for wafer fabrication monitor and control with enhanced efficiency and reduced cost (including measurement and metrology cost).

Figure 9:
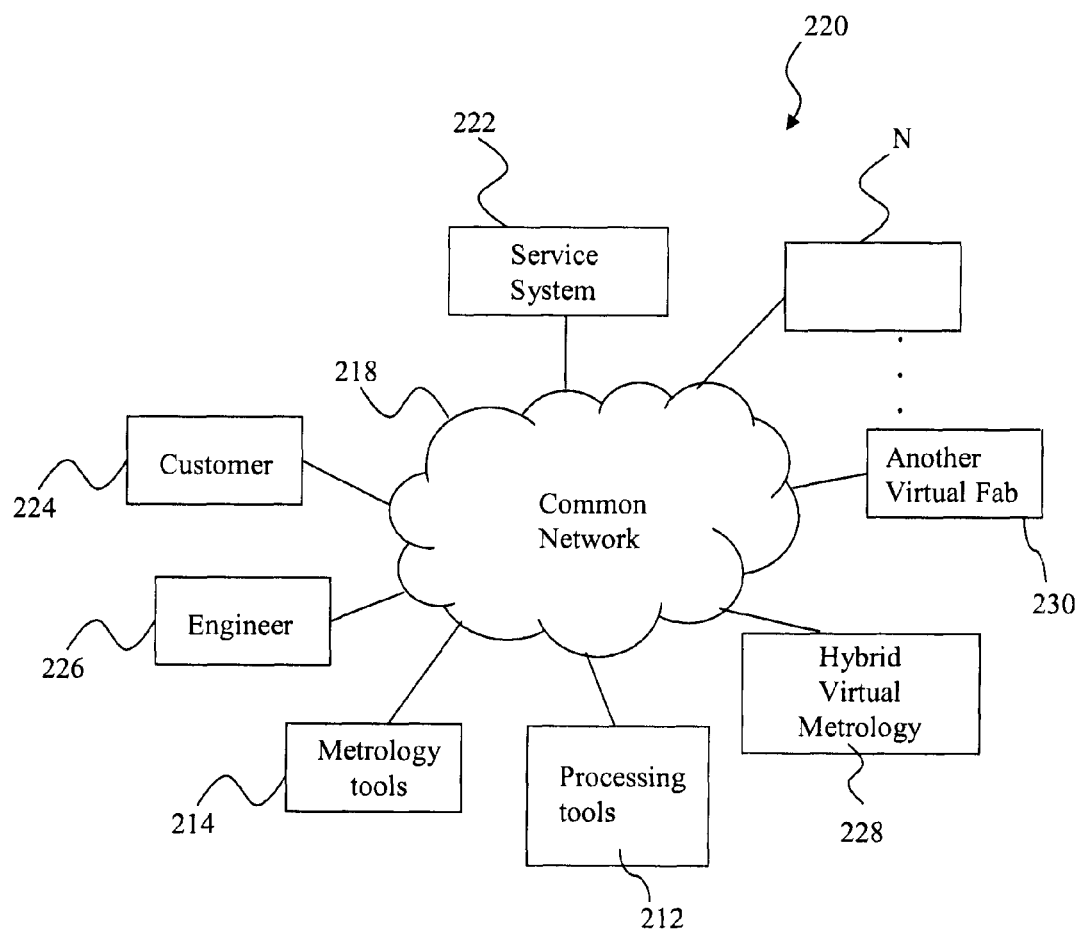
FIG. 9 is a block diagram of a virtual fabrication system, within which the virtual metrology system of FIG. 8 is utilized.

FIG. 9 illustrates a virtual integrated circuit fabrication system (a "virtual fab") 220, to which the system 200 of FIG. 8 may be connected. The virtual fab 220 includes a plurality of entities 222, 224, 226, 214, 212, 228, 230 . . . , N that are connected by a communications network 218. The network 218 may be a single network or may be a variety of different networks, such as an intranet and the Internet, and may include both wireline and wireless communication channels.

In the present example, the entity 222 represents a service system for service collaboration and provision, the entity 224 represents a customer, the entity 226 represents an engineer, the entity 214 represents a metrology tool for IC testing and measurement, the entity 212 represents processing (fabrication) tools, the entity 228 represents the wafer result prediction system 200 of FIG. 8, and the entity 230 represents another virtual fab (e.g., a virtual fab belonging to a subsidiary or a business partner). Each entity may interact with other entities and may provide services to and/or receive services from the other entities.

For purposes of illustration, each entity may be referred to as an internal entity (e.g., an engineer, customer service personnel, an automated system process, a design or fabrication facility, etc.) that forms a portion of the virtual fab 220 or may be referred to as an external entity (e.g., a customer) that interacts with the virtual fab 220. It is understood that the entities may be concentrated at a single location or may be distributed, and that some entities may be incorporated into other entities. In addition, each entity may be associated with system identification information that allows access to information within the system to be controlled based upon authority levels associated with each entities identification information. The virtual fab 220 enables interaction among the entities for the purpose of IC manufacturing, as well as the provision of services. In the present example, IC manufacturing includes receiving a customer's IC order, the associated operations needed to produce the ordered ICs, and sending them to the customer, such as the design, fabrication, testing, and shipping of the ICs. One of the services provided by the virtual fab 220 may enable collaboration and information access in such areas as design, engineering, and logistics. It is understood that these areas are exemplary, and that more or less information may be made available via the virtual fab 500 as desired.

Another service provided by the virtual fab 220 may integrate systems between facilities, such as between the metrology tools 214 and the processing tools 212. Such integration enables facilities to coordinate their activities. For example, integrating the metrology tools 214 and the processing tools 212 may enable manufacturing information to be incorporated more efficiently into the fabrication process, and may enable wafer data from the metrology tools to be returned to the processing tools for improvement and incorporation.

The above described method and system only serve as examples. The above method and system may be extended and modified and may include proper variations, embodiments, and alternatives without departure of the spirit of the invention.

Thus, the present disclosure provides a method for semiconductor wafer result prediction. The method includes collecting manufacturing data from various semiconductor manufacturing tools and metrology tools; choosing key parameters using an autokey method based on the manufacturing data; building a virtual metrology based on the key parameters; and predicting wafer results using the virtual metrology.

In various embodiments of the method, the selecting of the key parameters may further include using a hierarchical clustering method. The selecting of the key parameters may further include using a correlation distance as a selection threshold. The selecting of the key parameters may further include selecting key steps. The manufacturing data may include fault detection and classification (FDC) data. The selecting of the key parameters may include collecting time series data for the various manufacturing parameters from the FDC data; transferring the time series data into summarized data; and performing an autokey analysis to the summarized data to select the key parameters. The summarized data may be selected from the group consisting of an average value, a maximum value, a minimum value, a standard deviation, and combinations thereof. The various manufacturing parameters may include active parameters and passive parameters. The performing of the autokey analysis may include grouping various manufacturing processing parameters by a hierarchical clustering method; combining the various manufacturing parameters to form various representative parameters; and choosing the key parameters from the various representative parameters according to correlation coefficients. One of the key parameters may be a function of a subset of the various parameters. One of the key parameters may be associated with a root cause of wafer fault. The virtual metrology may include a first level model with input from the manufacturing data and output as physical parameters; and a second level model with input from the physical parameters and output as electrical parameters. The collecting of the manufacturing data may further include defining good data and bad fault detection and classification data from the manufacturing data; enhancing abnormal tool parameter capture rate by performing a pretreatment to the good and bad data; and performing self classification analysis based on n-sigma deviation between the good data and bad data.

The present disclosure also provides a wafer result prediction system. The system includes a first module designed for determining physical parameters based on manufacturing data; and a second module designed for determining electrical parameters based on the physical parameters and the manufacturing data.

In the disclosed system, each of the physical parameters may be expressed in manufacturing parameters associated with the manufacturing data. One of the electrical parameters may be expressed in the manufacturing parameters. One of the electrical parameters may be expressed in the physical parameters. The system may further include an evaluation module to value the electrical parameters for wafer acceptance according to predefined criteria.

The present disclosure also provides a system for wafer result prediction. The system includes a data collector designed for collecting manufacturing data, the manufacturing data including tool data from processing tools and wafer data from metrology tools; a key parameter module designed for identifying key parameters based on the manufacturing data and a hierarchical clustering method; a virtual metrology module constructed based on the key parameters, wherein the virtual metrology module; and a prediction module designed for predicting wafer results by utilizing the virtual metrology module. The virtual metrology includes a first model having the manufacturing data as input and physical parameters as output; and a second model having the physical parameters as input and electrical parameters as output. The key parameter module may be designed to identify the key parameters using a hierarchical clustering method.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A method for semiconductor wafer result prediction, comprising using software and hardware to perform:

collecting manufacturing data, including processing tool data from at least one semiconductor manufacturing tool and product data from at least one metrology tool, wherein the product data are collected from at least one actual wafer that has been processed by the at least one semiconductor manufacturing tool and the processing tool data are associated with at least one setting parameter of the semiconductor manufacturing tool during fabrication of the at least one actual wafer;

choosing key parameters using an autokey analysis based on the manufacturing data, wherein the autokey analysis includes:

grouping a plurality of processing parameters by a hierarchical clustering method using respective correlation distances, wherein the grouping groups together parameters of the plurality of processing parameters with respective correlation distances below a cut-off point to form a representative parameter; and selecting the representative parameter as one of the key parameters based on a correlation distance for the representative parameter;

building a virtual metrology based on the key parameters to produce at least one virtual parameter, wherein the virtual metrology comprises:

accepting the manufacturing data as a first input and outputting physical parameters; and accepting the physical parameters as a second input and outputting electrical parameters; and predicting wafer results using the at least one virtual parameter, wherein the predicting is performed with respect to the at least one actual wafer that has been processed by the at least one semiconductor manufacturing tool.

2. The method of claim 1, wherein choosing the key parameters comprises using a correlation distance as a selection threshold.

3. The method of claim 1, wherein choosing the key parameters comprises selecting key steps.

4. The method of claim 1, wherein the manufacturing data comprises fault detection and classification (FDC) data.

5. The method of claim 4, wherein choosing the key parameters comprises:
collecting time series data for manufacturing parameters from the FDC data;
transferring the time series data into summarized data; and
performing the autokey analysis on the summarized data to choose the key parameters.

6. The method of claim 5, wherein the summarized data are selected from a group consisting of an average value, a maximum value, a minimum value, a standard deviation, and combinations thereof.

7. The method of claim 5, wherein the manufacturing data comprises active parameters and passive parameters.

8. The method of claim 1, wherein the key parameters are a function of a subset of the manufacturing data.

9. The method of claim 1, wherein one of the key parameters is associated with a root cause of wafer fault.

10. The method of claim 1, wherein the collecting of the manufacturing data further comprising:
defining good data and bad fault detection and classification (FDC) data from the manufacturing data;
enhancing abnormal tool parameter capture rate by performing a pretreatment to the good and bad data; and
performing self classification analysis based on n-sigma deviation between the good data and bad data.

11. The method of claim 1 further comprising discarding the at least one actual wafer when the at least one actual wafer fails a virtual final wafer acceptance test.

12. The method of claim 1,
wherein the autokey analysis further includes determining a linear combination of the grouped parameters of the representative parameter, and
wherein the selecting of the representative parameter as one of the key parameters is further based on a correlation distance for the linear combination.

13. A wafer result prediction system, comprising:
a first collection mechanism to collect processing tool data from a semiconductor manufacturing tool, wherein the processing tool data are associated with one or more setting parameters of the semiconductor manufacturing tool during fabrication of a semiconductor wafer;
a second collection mechanism to collect product data from the semiconductor wafer;
a key parameter identification mechanism that:
groups together parameters of the one or more setting parameters with respective correlation distances below a cut-off point to form a representative parameter, wherein the representative parameter is a linear combination of the grouped parameters; and
selects the representative parameter as a key parameter based on a correlation distance for the representative parameter;
a virtual metrology mechanism that:
determines physical parameters of the semiconductor wafer based on the processing tool data and the product data; and
determines electrical parameters based on the physical parameters, the processing tool data, and the product data; and
a wafer results predicting mechanism for receiving the electrical and physical parameters and predicting whether the semiconductor wafer that is currently undergoing fabrication meets one or more predetermined criteria,
wherein at least one of the first collection mechanism, the second collection mechanism, the key parameter identification mechanism, the virtual metrology mechanism, and the wafer results predicting mechanism includes software and hardware.

14. The wafer result prediction system of claim 13, wherein the wafer results predicting mechanism further comprises an evaluation module to value the electrical parameters for wafer acceptance according to the predefined criteria.

15. A system for wafer result prediction, comprising:
a data collector designed for collecting manufacturing data, the manufacturing data including tool data from processing tools and wafer data from metrology tools, wherein the tool data are associated with settings of semiconductor fabrication tools and the wafer data are associated with measurements made on an actual wafer having undergone semiconductor fabrication processing;
a key parameter module designed for identifying key parameters based on a correlation distance between process parameters and device parameters, wherein the key parameter module is operable to:
group together parameters of the process parameters with respective correlation distances below a cut-off point to form representative parameters; and
select one of the representative parameters as one of the key parameters when a correlation distance between the one of the representative parameters and a device parameter meets a threshold criteria;
a virtual metrology module constructed based on the key parameters, wherein the virtual metrology module is operable to:
accept the manufacturing data as input and return physical parameters as output; and
thereafter accept the physical parameters as input and return electrical parameters as output; and
a prediction module designed for predicting wafer results for the actual wafer having undergone semiconductor fabrication processing by utilizing the virtual metrology module,
wherein at least one of the data collector, the key parameter module, the virtual metrology module, and the prediction module includes software and hardware to implement a function thereof.

16. The system of claim 15, wherein the key parameter module is designed to identify the key parameters using a hierarchical clustering method.

17. The system of claim 15, wherein each of the representative parameters includes a linear combination of the grouped parameters of the process parameters.

* * * * *